United States Patent [19]

Harp et al.

[11] Patent Number: 5,303,842
[45] Date of Patent: Apr. 19, 1994

[54] FUEL METER AND THEFT PREVENTION DEVICE

[76] Inventors: Tammie Harp, Rte. 2, Box 420 C-2, Lowell, Ark. 72745; Bobby Lewis, Rte. 1, Wesley, Ark. 72773; James Miller, 1600 Ridgecrest, Springdale, Ark. 72764

[21] Appl. No.: 917,312

[22] Filed: Jul. 23, 1992

[51] Int. Cl.⁵ .............................................. B65B 31/00
[52] U.S. Cl. .................... 220/562; 220/86.2
[58] Field of Search .................... 220/562, 86.1, 86.2; 73/861.77, 861.79

[56] References Cited

U.S. PATENT DOCUMENTS

| | | | |
|---|---|---|---|
| 1,269,020 | 6/1918 | Tactkian | 220/86.1 X |
| 1,931,335 | 10/1933 | Terry | 220/86 |
| 1,984,590 | 12/1934 | Maddin | 220/86 |
| 2,107,600 | 2/1938 | Darms | 220/86 |
| 2,281,448 | 4/1942 | Mathey | 220/86 |
| 2,313,266 | 3/1943 | Roberts | 220/86 |
| 2,373,470 | 4/1945 | Hanke | 70/168 |
| 2,496,992 | 2/1950 | Glidden | 220/86 |
| 3,016,162 | 1/1962 | Cioffi | 220/86 |
| 3,610,263 | 10/1971 | Walters | 137/43 |
| 3,951,297 | 4/1976 | Martin | 220/86 |
| 4,326,641 | 4/1982 | Wilken | 220/86 |
| 4,650,087 | 3/1987 | White | 220/86 |
| 4,700,579 | 10/1987 | Hall | 73/861.78 |
| 4,856,348 | 8/1989 | Hall | 73/861 |
| 4,974,645 | 12/1990 | Johnson | 220/86.2 X |
| 5,025,946 | 6/1991 | Butkovich et al. | 220/86 |

OTHER PUBLICATIONS

GPI® Turbine Installation Guidelines, pp. 1 and 2, Oct. 1990.
GPI® Electronic Digital Meter Owner's Manual, pp. 1-21, Aug. 1990.

Primary Examiner—Steven M. Pollard
Attorney, Agent, or Firm—Robert R. Keegan

[57] ABSTRACT

A fuel meter and theft prevention apparatus is provided which not only prevents siphoning of fuel from a fuel tank, but also senses and records the amount of fuel added to the tank. A company or business can use the recorded fuel added amount to insure that they are charged only for fuel which is placed in the tank. In accordance with an exemplary embodiment of the present invention, the fuel meter and theft prevention device includes a tamper proof cap adapted for connection to a conventional diesel fuel tank, a digital turbine flow meter including non-resettable recording means for recording total liquid flow through the meter, an apparatus for preventing high velocity gas flow through the meter while allowing generally unimpeded liquid flow therethrough, and a nozzle adapted to receive fuel. The tamper proof cap includes a vent for releasing air from the fuel tank and a check valve for only allowing fuel to flow into the fuel tank.

19 Claims, 3 Drawing Sheets

FUEL METER AND THEFT PREVENTION DEVICE

BACKGROUND OF THE INVENTION

The present invention is directed to anti-theft devices for fuel tanks, and, more particularly, concerns an anti-theft device which prevents fuel siphoning and provides for the measurement of fuel added to a fuel tank.

Fuel theft is not a new problem. Anti-theft devices have been developed in the past to prevent the siphoning of fuel from fuel tanks. For example, U.S. Pat. No. 3,951,297 describes an anti-siphon gas tank adaptor for use with large truck gasoline or diesel fuel tanks and which prevents the insertion of a siphoning tube into the tank.

Although these anti-siphoning devices effectively prevent the unauthorized removal of fuel from a fuel tank, they do not address a different type of fuel theft where the fuel never reaches the fuel tank. Modern commercial vehicle operators use company charge cards or charge accounts for purchasing fuel in large quantities, for example, fifty to two hundred gallons at a time. Unscrupulous vehicle operators have been known to make fuel charges for fuel which was not added to the fuel tank of their vehicle, but instead added to the fuel tank of an accomplice vehicle operator's vehicle for which the accomplice operator gives the unscrupulous operator a kickback for the fuel. Similarly, an unscrupulous vehicle operator may work with an accomplice service station attendant who will knowingly charge the unscrupulous operator for fuel not delivered and give the unscrupulous operator a kickback for the fraudulent fuel charge.

Unscrupulous vehicle operators or service station attendants can get away with this type of theft because it is difficult for companies to keep track of the exact amount of fuel required by each vehicle based on the number of miles driven. It is especially difficult to accurately predict fuel consumption of modern large diesel trucks having a two tank fuel system including fuel return lines from the engine to the fuel tanks. Such trucks may get anywhere between about five to eight miles per gallon depending on factors including how the truck is driven, the type of load being hauled, for example, a flat bed or a trailer, and the type of terrain traveled.

In light of the foregoing, a need exists for an improved anti-theft device which provides a means of insuring that the fuel reaches the fuel tank and is not siphoned from it subsequently.

SUMMARY OF THE INVENTION

In accordance with the present invention, a fuel meter and theft prevention device and method is provided which measures the volume of fuel added to a fuel tank and prevents the siphoning of fuel from the tank.

In accordance with an exemplary embodiment of the present invention, the fuel meter and theft prevention device includes a tamper proof cap adapted for connection to a conventional diesel fuel tank, a digital turbine flow meter including non-resettable recording means for recording total liquid flow through the meter, an apparatus for preventing high velocity gas flow through the meter while allowing generally unimpeded liquid flow therethrough, and a nozzle adapted to receive fuel. The tamper proof cap includes a vent for releasing air from the fuel tank. valve for only allowing fuel to flow into the fuel tank.

In accordance with a particular embodiment of the present invention, the apparatus for preventing high velocity gas flow through the flow meter is a gas venting arrangement including a screen element for disrupting gas flow and a vent for venting gas to the atmosphere. In accordance with a different particular embodiment of the present invention, the high velocity gas flow prevention apparatus is a ball valve arrangement wherein the ball is made of a material which is buoyant in the presence of a liquid and tends to float, but which is not effected by the presence of a gas.

A principal object of the present invention is the provision of a fuel meter and theft prevention device and method which is tamper proof, effectively measures the volume of fuel added to a fuel tank and prevents the siphoning of fuel after it is added to the tank.

Another object of the present invention is the provision of a fuel meter and theft prevention device which is relatively inexpensive, easy to install, and provides for substantially unimpeded liquid flow therethrough.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
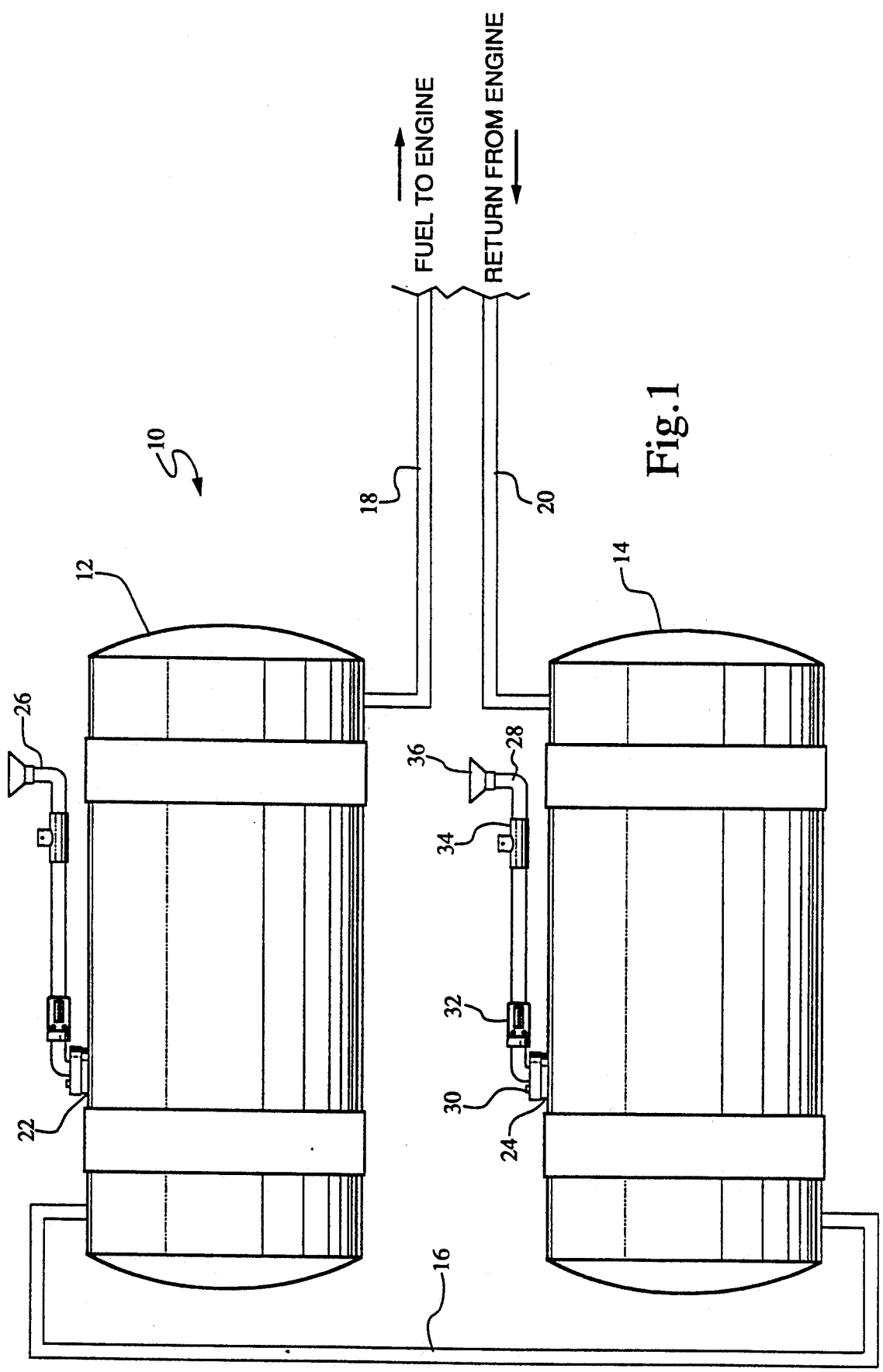
FIG. 1 is a schematic illustration of a typical two tank fuel system common to large commercial diesel vehicles and which has been modified to include two fuel meter and theft prevention devices in accordance with the present invention.

In accordance with an exemplary embodiment of the present invention as shown in FIG. 1 of the drawings, a typical two tank fuel system used on large commercial diesel vehicles has been modified to incorporate two fuel meter and theft prevention devices of the present invention and is generally designated by the reference numeral 10. The conventional components of the two tank system include first and second fuel tanks 12 and 14, a fuel line 16 providing for passage of fuel between the tanks, a fuel line 18 leading from the first tank 12 and providing diesel fuel to the engine, and a fuel return line 20 allowing for unburned fuel to be returned from the engine to the second tank 14. Each of the first and second tanks 12 and 14 have respective conventional fuel inlets or spouts 22 and 24 having connected thereto fuel meter and theft prevention devices 26 and 28 of the present invention. Each of the fuel metering and theft prevention devices 26 and 28 is of identical construction and includes as major components a tamper proof cap 30, a turbine flow meter 32, a high velocity gas flow prevention apparatus 34, and a fuel input nozzle 36.

Because of the large capacities of the two tanks 12 and 14, for example, approximately one hundred to one hundred-fifty gallons each, the variability of the fuel consumption rate of each diesel vehicle, and the return of unused fuel from the engine to the tanks, it is extremely difficult to determine the actual fuel consumption of each vehicle based on the miles driven. In order to prevent the company operating the vehicles from being charged by unscrupulous vehicle operators or service stations attendants for fuel not added to either of the tanks 12 or 14, the fuel meter and theft prevention devices 26 and 28 have been attached to each tank inlet 22 and 24 to monitor the amount of fuel added. For example, any fuel added to tank 14, other than by the fuel return line from the engine, must be deposited into the fuel receiving nozzle 36, flow through the gas flow prevention apparatus 34, then through the flow meter 32 where the volume of fuel flowing therethrough is registered on both resettable and nonresettable recording elements, and then through cap 30 into the fuel tank 14.

Each of the devices 26 and 28 not only monitors the volume of fuel added to each tank, but also includes elements which prevent the insertion of a siphoning tube down into the tank and a check valve for preventing the flow of fuel from each of the tanks. As such, the devices 26 and 28 are designed to prevent both the type of theft where the fuel never reaches the fuel tank and where fuel is extracted from a fuel tank.

In order for a vehicle owning or operating company to know that they are being charged only for fuel which is actually added to the tank of the particular vehicle, the fuel meter and theft prevention devices 26 and 28 of the present invention accurately measure the volume of fuel actually added to each tank. In order for the metering devices 26 and 28 to be effective, they must be tamper proof to prevent unscrupulous vehicle operators or service station attendants from removing the devices and siphoning fuel from the tanks, from being able to mechanically manipulate the flow meter or flow registers to produce an inaccurate reading, or from, for example, sticking a high pressure air hose down the nozzle 36 and causing the flow meter to register additional volumes by causing air to flow through the meter.

Figure 2:
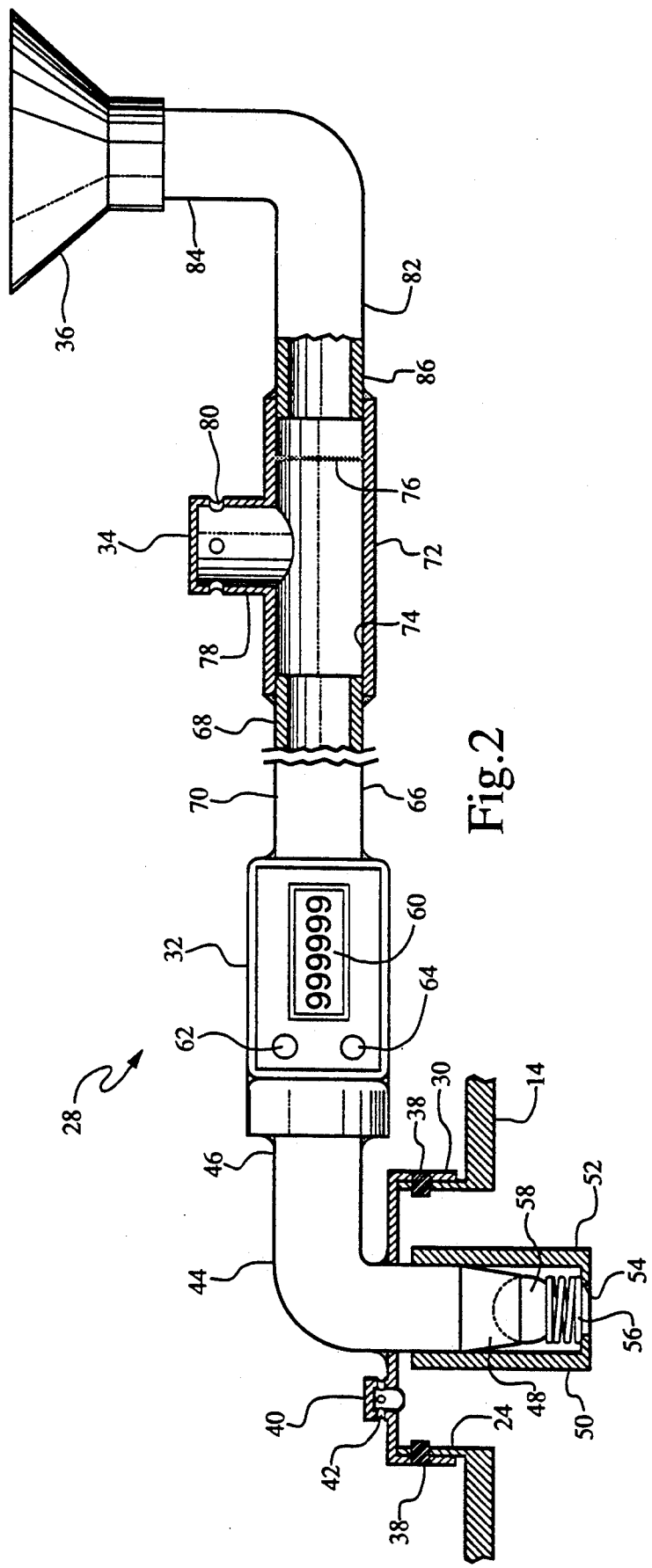
FIG. 2 is an enlarged partial cross-section representation of one of the fuel meter and theft prevention devices of FIG. 1.

As shown in more detail in FIG. 2 of the drawings, in accordance with one embodiment of the present invention, the cap 30 of the fuel meter and theft prevention device 28 is secured to the spout or inlet port 24 of the fuel tank 14 in a tamper proof manner by at least two one-quarter inch pins 38. The pins 38 are press fit into corresponding circular openings in both the spout 24 and cap 30. The pins 38 may be permanently secured in position by, for example, welding. The cap 30 also includes an air vent structure 40 having a plurality of small openings 42 which allow air to enter or leave the interior of the tank 14. The openings 42 in the air vent 40 are small enough so as to prevent the insertion of a siphoning tube into the tank 14.

The flow meter 32 is operatively connected to the cap 30 by a one inch diameter steel pipe 44. The pipe 44 is in the shape of an elbow and has a first end 46 welded to the outlet of the flow meter 32 and a second end 48 which passes through a circular opening in the cap 30 and extends down into the tank 14. The pipe 44 is welded to the cap 30 so as to be permanently joined thereto in a tamper proof manner.

A check valve assembly 50 is secured to the pipe end 48 below the cap 30. Cavitation, or vapor pockets in the flow stream, can cause the turbine meter to give inaccurate readings. A back pressure of between five to fifty psi and proper installation of the flow meter 32 will prevent cavitation. The lower the flow rate, the lower the back pressure required. The check valve assembly 50 includes a cylindrical housing 52 having a circular fuel output orifice 54, and supports therein a biasing spring 56 having a diameter larger than the orifice 54, and a check ball 58 having a diameter larger than the bore of the pipe 44. The pipe end 48 is tapered so as to facilitate insertion of the pipe 44 through the cap 30 and insertion of the cylinder 52 over the pipe end 48. The check valve 50 limits the flow of fuel to a direction into the fuel tank 14 and provides a sufficient back pressure on the fuel flowing through the pipe 44 to allow the flow meter 32 to operate accurately.

The flow meter 32 is preferably a three to thirty gallon per minute turbine flow meter such as a McMaster-Carr P/N 3A31GM or equivalent distributed by Great Plains Industries, Inc., Wichita Kans. 67207. Such turbine flow meters are described in U.S. Pat. Nos. 4,700,579 and 4,856,348 which are hereby incorporated by reference. The preferred turbine flow meter having a three to thirty gallon per minute flow range also includes one inch NPT (ISO) female inlet and outlet threads, a one inch inner diameter fluid passage, a one psig pressure drop ($H_2O$) at thirty GPM flow rate, and an operation temperature range of +14° F. to +140° F. The preferred flow meter has an aluminum housing and overall dimensions of four inches wide, two inches high, and two inches deep. To prevent foreign material from clogging the rotor of the meter, it is recommended that a 350 micron (0.015 dia.) filter be installed upstream of the meter. The accuracy of such a meter with a factory calibration is ±1½ percent, with a single point calibration is ±1 percent, and with a two point calibration is ±½ percent.

The flow meter 32 has a digital display 60, a calibration button 62, and a display button 64. The flow meter 32 is self-contained in that it includes a battery pack, a flow computer (digital circuitry) controlled by the operator via the calibration and display buttons, and a turbine blade flow sensor. The calibration button 62 is used to access field calibration functions, but may be absent on models with single factory preset calibration. The display button 64 controls most functions. The flow computer has up to three total registers, any of which may be resettable or locked (non-user resettable). In accordance with the present invention, at least one total register is locked (non-user resettable) to serve as a total fuel volume register and one of the total registers is resettable by the operator and used as a trip register recording the volume of fuel added during a particular trip by a particular opertor. The display button 64 is pressed and released in order to display the amount in each of the total registers, flow rate information, or to select a bypass mode wherein the computer is disconnected from the turbine and will not accumulate flow. The display button 64 can also be pressed and held for a few seconds to reset a resettable total register to zero. Locked total registers cannot be cleared except by removing or disconnecting the batteries.

A one inch steel pipe 66 has a first end 68 connected to the output side of the gas flow prevention device 34 and a second end 70 threaded into and tack welded to the inlet of the flow meter 32. In order to provide for an accurate measurement by the flow meter 32, it is recommended that pipe 66 be twenty or more inches in length and that pipe 44 be five or more inches in length upstream of the bend therein. This will minimize the monuniform velocity or swirling that is caused by elbows or valves in the system upstream of, the flow meter. Flow straightening vanes may be placed upstream from the meter to shorten the upstream pipe length requirement to ten or more inches and to enhance meter accuracy. The pipes 44 and 66 are tack welded to the housing of the flow meter 32 so as to prevent removal of the flow meter and tampering therewith.

The high velocity air flow prevention apparatus 34 as illustrated in FIGS. 1 and 2 of the drawings includes a T-shaped steel body 72 having one inch NPT (ISO) female inlet and outlet threads, a one inch inner diameter fluid passage 74, a 350 micron screen, filter, or mesh 76 mounted transverse to the fluid passage 74 and in the upstream end thereof, and an air vent 78 extending upwardly from the fluid passage 74. The air vent structure 78 includes a plurality of air vent openings 80 located a sufficient height above the fluid passage 74 so that during normal fuel dispensing, fuel passes through the fluid passage 74, the flow meter 32, and the check valve 50 into the tank 14. High pressure air or gas introduced into the nozzle 36 is disrupted by the screen 76 and exits through air venting openings 80 rather than forcing open the check valve 50 and passing into the tank 14. The screen or mesh 76 also prevents tampering with the turbine flow sensor in the fuel meter 32 by blocking passage of any mechanical device through the fluid passage 74. The screen or mesh 76 can be checked periodically to insure that it is intact and operative.

A one inch steel pipe 82 provides fluid communication between the fuel input nozzle 36 and the air passage prevention apparatus 34. The pipe 82 has an input end 84 welded to the nozzle 36 and an output end 86 tack welded to the inlet of the casing 72.

Figure 3:
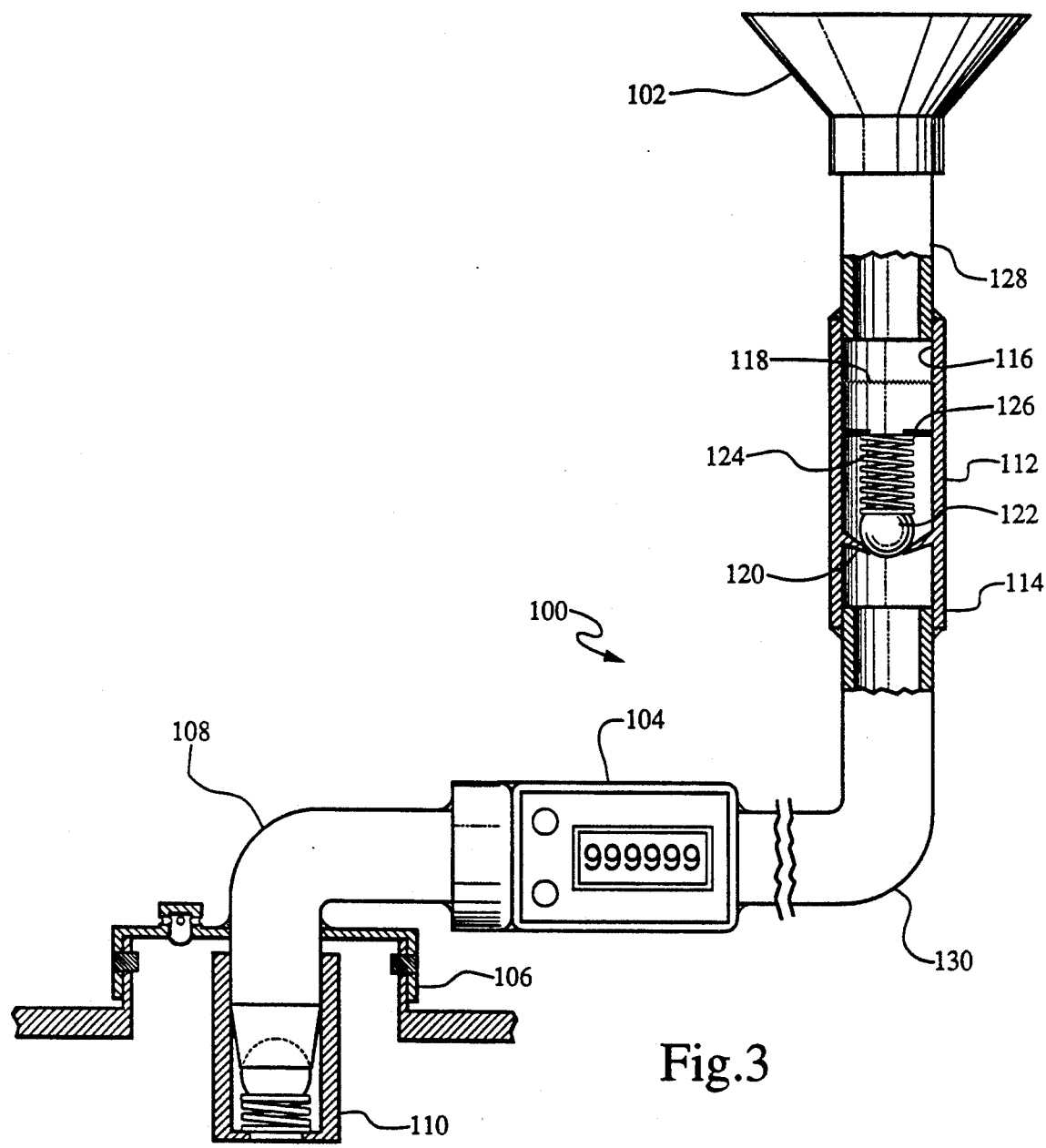
FIG. 3 is an enlarged partial cross-section illustration of a second embodiment of a fuel meter and theft prevention device of the present invention.

In accordance with another embodiment of the present invention, and as shown in FIG. 3 of the drawings, a fuel meter and theft prevention device generally designated by the reference numeral 100 is shown to include a nozzle 102, a flow meter 104, a cap 106, an elbow pipe 108, and a check valve 110, which are exactly the same as those components in the devices 26 and 28 of FIGS. 1 and 2. For example, the flow meter 104 of the device 100 is exactly the same as the flow meter 32 of the device 28 and has at least one locked (non-user resettable) total register for recording the total volume of fuel flow therethrough and one resettable total register which will serve as a trip register.

The device 100 differs from the devices 26 and 28 of FIGS. 1 and 2 in that it includes a check valve type air passage prevention apparatus 112 designed to be oriented vertically whereas the vent-type air passage prevention apparatus 34 of FIGS. 1 and 2 is designed for a horizontal orientation. The air passage prevention apparatus 112 includes a cylindrical casing 114 having one inch NPT (ISO) female inlet and outlet threads and a one inch inner diameter fluid passage 116. Mounted in the upstream end of the fluid passage 116 and transverse to the passage 116 is a 350 micron screen, filter or mesh 118 which allows for the passage of liquids and gases therethrough but blocks the passage of solids and mechanical elements. Mounted near the downstream end of the fluid passage 116 is an annular ball seat 120, a ball 122, for example, a hollow plastic ball or sphere, a biasing spring 124, and a spring seat 126 having a central opening or orifice providing for the passage of liquid.

The nozzle 102 is connected to the upstream end of the casing 114 by a straight length of one inch steel pipe 128. An L-shaped length of one inch steel pipe 130 provides fluid communication between the downstream end of the casing 114 and the inlet of the flow meter 104. The pipes 128 and 130 are tack welded to the casing 114 to prevent tampering with the apparatus 112.

In operation, the air flow passage prevention apparatus 112 allows for the passage of liquids, such as diesel fuel or gasoline therethrough, but prevents the passage of air. The ball 122 is buoyant and as such floats in liquids such as diesel fuel or gasoline and rises up away from the ball seat 120 thereby allowing for liquids to pass through the casing 114 and on to flow meter 104. When air is presented into the apparatus 112, the air flow is disrupted by the mesh 118 and the ball 122 remains seated on the ball seat 120 because of the biasing force provided by the spring 124 and, thereby, prevents passage of air through the casing 114.

In order for the flow meter 104 to provide the most accurate measurement of flow therethrough, it is recommended that pipe 108 have five or more inches of straight pipe length upstream of the bend or elbow therein and that pipe 130 have twenty or more inches of straight pipe length located upstream of the flow meter inlet. These recommended pipe lengths will provide a uniform velocity profile of the flow stream entering the meter throughout the cross-section of the pipe. Flow straightening vanes placed upstream from the meter shorten the upstream pipe length requirement to ten or more inches and will enhance meter accuracy.

Figure 4A:
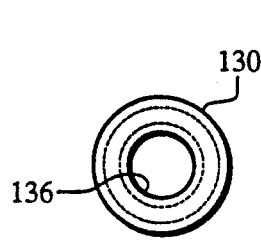
FIG. 4A is an end view representation of an outlet of a nozzle in accordance with one embodiment of the present invention.
Figure 4B:
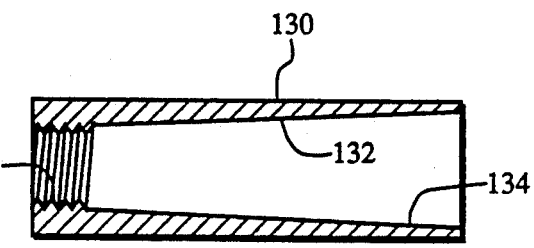
FIG. 4B is a cross-section illustration of the nozzle of FIG. 4A.
Figure 4C:
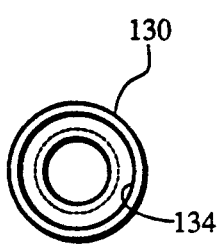
FIG. 4C is an end view representation of the inlet of the nozzle of FIGS. 4A and 4B.

In accordance with a preferred embodiment of the present invention as shown in FIGS. 4A-4C of the drawings, a fuel receiving nozzle 130 is a six inch length of two inch outer diameter aluminum pipe having a central bore 132 which tapers from a one and three-quarter inch inner diameter at the fuel input end 134 down to one inch NPT pipe threads at a fuel outlet end 136. The one inch NPT pipe threads extend for approximately eight-tenths of an inch along the length of the nozzle 130. Such a nozzle may be used as the nozzle 36 of the devices 26 and 28 or as the nozzle 102 of the device 100.

Although the fuel meter and theft prevention device and method of the present invention is adapted for use with vehicle fuel tanks, especially large commercial vehicle fuel tanks, it is to be understood that it may be used equally well on stationary fuel tanks not associated with a vehicle The flow meters 32 of the devices 26 and 28 and the flow meter 104 of the device 100 provide a means for monitoring the total volume of fuel added to a fuel tank. This total volume measurement can be used by the company owning or operating the vehicle to insure that they are only charged for fuel which is added to the tank. For example, they can monitor the locked (non-user resettable) total register and check this figure against the bill for fuel charges. The resettable (non-locked) total register in the flow meters 32 and 104 provides a means for the vehicle operator to keep track of total fuel consumption for a particular trip or leg of a trip. The batteries in each of the flow meters are designed to provide 2,000 hours of operation and as such could provide a year or more of service before having to be replaced.

Thus, it will be appreciated that as a result of the present invention, a highly effective and improved fuel meter and theft prevention device and method is provided by which the principal objective among others is completely fulfilled. It is contemplated and will be apparent from those skilled in the art from the preceding description and accompanying drawings that modifications and or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. Tamper-proof fuel meter and theft prevention apparatus for a fuel tank having a fuel inlet comprising:

a tamper-proof cap for connection to the fuel tank inlet;

an in-line electronic fluid flow meter having an inlet, an outlet, non-resettable recording means for recording total liquid flow through said meter, and a fuel flow sensor, said flow meter outlet being permanently connected by a first conduit to said tank through said cap;

means for preventing tampering with said fuel flow sensor by causing liquid fuel flowing through said flow meter to be sensed and recorded by said fuel flow sensor;

a second conduit permanently connected at one end to said flow meter inlet and at another end to an outlet of said means for preventing flow tampering;

a third conduit having one end permanently connected to an inlet of said means for preventing tampering and having another end adapted to receive fuel; and means for preventing siphoning of fuel from the fuel tank and for preventing activation of said flow sensor by high velocity gas injected into said third conduit whereby said apparatus provides for an accurate measurement of the fuel added to the fuel tank and prevents the siphoning of fuel from said fuel tank.

2. Apparatus as recited in claim 1 wherein said fuel tank is a vehicle mounted fuel tank.

3. Apparatus as recited in claim 2 wherein said fuel tank is a commercial vehicle diesel fuel tank having provision for fuel return from the engine.

4. Apparatus as recited in claim 1 further including resettable recording means for recording liquid flow through said meter, an operator observable display for showing said resettable recording, and operator usable resetting means for said resettable recording.

5. Apparatus as recited in claim 1 wherein said fuel flow sensor comprises a rotatable turbine element for sensing liquid flow and wherein said flow meter includes electronic means for calibration of said meter for liquid density and other parameters.

6. Apparatus as recited in claim 1 wherein said flow meter is battery powered and is provided with a tamper-proof battery compartment.

7. Apparatus as recited in claim 1 wherein said cap includes a check valve which allows fuel to flow into said tank and creates a backpressure on fuel flowing through said flow meter.

8. Theft and fraud prevention apparatus for installation in a commercial vehicle having a fuel tank comprising:

a non-removable connector for an inlet opening of said tank;

a fluid-tight tube attached at one end to said connector with its other end adapted to receive fuel from a fuel dispensing nozzle;

fluid flow meter means within said tube having an inlet, an outlet, a fuel flow sensor, and means for causing said fuel flow sensor to be only activated by fuel flowing therethrough including means for preventing activation of said sensor by gaseous fluid input to said tube, said meter means outlet being permanently connected by a conduit to said connector; and non-resettable recording means for recording total liquid flow through said meter means whereby said apparatus provides for the accurate measurement of fuel added to the fuel tank.

9. Apparatus as recited in claim 8 further including resettable recording means for recording liquid flow through said meter means, an operator observable display for showing said resettable recording, and operator usable resetting means for said resettable recording.

10. Apparatus as recited in claim 8 wherein said flow meter means has a rotatable turbine element for sensing liquid flow and electronic means for calibration of said meter means for liquid pressure and other parameters.

11. Apparatus as recited in claim 8 wherein said means for preventing activation of said sensor by gaseous fluid input to said tube includes a valve normally closed to gas flow but responsive to liquid presence to open for liquid flow.

12. In a vehicle having an engine, a drive train, and at least one fuel tank, the improvement comprising:

a tube adapted to receive a conventional vehicle fuel dispensing nozzle;

a flow meter having an inlet permanently connected to said tube, an outlet, and sensing means for sensing and recording liquid volume flow in a non-resettable register and being insensitive to gas flow induced into said tube;

a conduit permanently connected to said outlet for conducting liquid from said meter to an inlet of the fuel tank; and means for connecting said conduit to the fuel tank in a manner to prevent unauthorized removal whereby said flow meter provides an accurate measurement of fuel added to the fuel tank.

13. Vehicle as recited in claim 12 wherein said valve means includes a liquid responsive upstream of said sensing means to prevent high velocity gas flow through said sensing means while allowing generally unimpeded liquid flow therethrough.

14. Vehicle as recited in claim 12 further including resettable recording means for recording liquid flow through said meter, an operator observable display for showing said resettable recording, and operator usable resetting means for said resettable recording.

15. Vehicle as recited in claim 12 wherein said sensing means includes a rotatable turbine element for sensing liquid flow and said flow meter includes electronic means for calibration of said meter for liquid pressure and other parameters.

16. Vehicle as recited in claim 12 wherein said flow meter is battery powered and is provided with a battery compartment not accessible to the vehicle operator.

17. Vehicle as recited in claim 12 wherein said means for connecting includes valve means for allowing fuel flow into said tank while restricting fuel flow out of said tank.

18. In a vehicle fuel system including at least one fuel fill opening connected to at least one fuel tank having a fuel inlet and a fuel outlet, the improvement comprising:
tamper proof flow meter means permanently connected to said fuel tank inlet for sensing and recording the liquid fuel volume added to said fuel tank, means for preventing tampering with said flow meter means, said means for preventing tampering being located between said fuel fill opening and said flow meter, said means allowing activation of said flow meter means by liquid flow and preventing activation by gas flow whereby said flow meter means provides an accurate measurement of fuel added to the fuel tank.

19. System as recited in claim 18 wherein said flow meter means includes a non-resettable register for recording liquid fuel volume.

* * * * *